United States Patent [19]

Shiomura et al.

[11] Patent Number: 5,219,968
[45] Date of Patent: Jun. 15, 1993

[54] PROPYLENE COPOLYMER

[75] Inventors: Tetsunosuke Shiomura, Tokyo; Tadashi Asanuma, Takaishi; Masashiro Kouno, Manazurumachi; Norihide Inoue, Yokohama; Satoshi Fukushima, Yokohama; Yoshiho Sonobe, Yokohama; Kazumi Mizutani, Yokohama; Tutomu Iwatani; Ryuichi Sugimoto, both of Takaishi, all of Japan

[73] Assignee: Mitsui Toatsu Chemicals, Inc., Tokyo, Japan

[21] Appl. No.: 777,238

[22] PCT Filed: Apr. 9, 1991

[86] PCT No.: PCT/JP91/00466
§ 371 Date: Nov. 12, 1991
§ 102(e) Date: Nov. 12, 1991

[87] PCT Pub. No.: WO91/15523
PCT Pub. Date: Oct. 17, 1991

[30] Foreign Application Priority Data

Apr. 9, 1990 [JP] Japan ................. 2-92303
May 21, 1990 [JP] Japan ................. 2-129022
May 22, 1990 [JP] Japan ................. 2-130166

[51] Int. Cl.$^5$ ............................................. C08F 236/00
[52] U.S. Cl. .................................. 526/283; 526/339; 526/348.2; 526/348.3; 526/348.6
[58] Field of Search ........................... 526/283, 339

[56] References Cited

U.S. PATENT DOCUMENTS

| | | | |
|---|---|---|---|
| 4,892,851 | 1/1990 | Ewen et al. | 526/160 |
| 5,026,798 | 6/1991 | Canich | 526/127 |
| 5,084,534 | 1/1992 | Welborn, Jr. et al. | 526/339 |

FOREIGN PATENT DOCUMENTS

| | | |
|---|---|---|
| 0283164 | 9/1988 | European Pat. Off. |
| 0351391 | 1/1990 | European Pat. Off. |
| 2-41303 | 2/1990 | Japan . |
| 2-41305 | 2/1990 | Japan . |

Primary Examiner—Joseph L. Schofer
Assistant Examiner—David Wu
Attorney, Agent, or Firm—Burns, Doane, Swecker & Mathis

[57] ABSTRACT

A substantially syndiotactic propylene copolymer which comprises propylene and at least one cyclic diolefin having 6 to 25 carbon atoms or an alkadiene having 6 to 25 carbon atoms and at least one terminal double bond, in the $^{13}$C-NMR spectrum of the copolymer measured in a 1,2,4-trichlorobenzene solution, a peak intensity observed at about 20.2 ppm as the reference of tetramethylsilane at 0.0 ppm being 0.5 or more of the total peak intensity attributed to methyl groups of propylene; the content of the cyclic diolefin or the alkadiene being from 0.01 to 20 mol %; the intrinsic viscosity [η] of the copolymer measured in a tetralin solution at 135° C. being from 0.1 to 10 dl/g.

This copolymer can contain an α-olefin other than propylene, particularly ethylene.

10 Claims, 14 Drawing Sheets

PROPYLENE COPOLYMER

TECHNICAL FIELD

The present invention relates to a propylene copolymer, and more specifically, it relates to a copolymer comprising propylene and a specified cyclic diolefin or alkadiene and having a substantially syndiotactic structure.

BACKGROUND ART

It has been known for a long period of time that a syndiotactic polypropylene is prepared by polymerizing propylene at a low temperature in the presence of a catalyst comprising a vanadium compound and an organic aluminum. However, the polymer prepared by the conventional process is poor in syndiotacticity, and it is scarcely considered that the thus prepared polymer exerts inherent characteristics of the syndiotactic polypropylene.

In J. A. Ewen et al., J. Amer. Chem. Soc., Vol. 110, 6255–6256 (1988), there are disclosed a highly syndiotactic polypropylene and its preparation method. However, the syndiotactic polypropylene described in the J. A. Ewen et al. literature has good physical properties in the manufacture of molded articles, but it is low in adhesiveness and dyeability and has poor moldability.

DISCLOSURE OF THE INVENTION

An object of the present invention is to provide a novel propylene copolymer.

Another object of the present invention is to provide a method for preparing the above-mentioned propylene copolymer.

Other objects of the present invention will be apparent from the undermentioned description.

A propylene copolymer of the present invention having a substantially syndiotactic structure is a copolymer comprising the repeating units of propylene and the repeating units of at least one diene selected from the group consisting of cyclic diolefins having 6 to 25 carbon atoms and alkadienes having 6 to 25 carbon atoms and at least one terminal double bond; the content of the repeating units of the diene being from 0.01 to 20 mol %; in the $^{13}$C-NMR spectrum of the copolymer measured in a 1,2,4-trichlorobenzene solution, a peak intensity observed at about 20.2 ppm as the reference of tetramethylsilane being 0.5 or more of the total peak intensity attributed to methyl groups of propylene; the intrinsic viscosity of the copolymer measured in a tetralin solution at 135° C. being from 0.1 to 10 dl/g.

The propylene copolymer having the syndiotactic structure can be obtained by copolymerizing propylene and at least one diene selected from the group consisting of cyclic diolefins having 6 to 25 carbon atoms and alkadienes having 6 to 25 carbon atoms and at least one terminal double bond in the presence of a transition metal compound represented by the formula

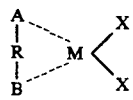

(wherein A and B are mutually different cyclic unsaturated hydrocarbon residues, R is a hydrocarbon residue having 1 to 20 carbon atoms or a group containing silicon or germanium which connects A with B, X is a halogen atom or a hydrocarbon residue having 1 to 20 carbon atoms, and M is a metal atom selected from the group consisting of titanium, zirconium and hafnium) and a co-catalyst.

BEST MODE FOR CARRYING OUT THE INVENTION

Figure 1:
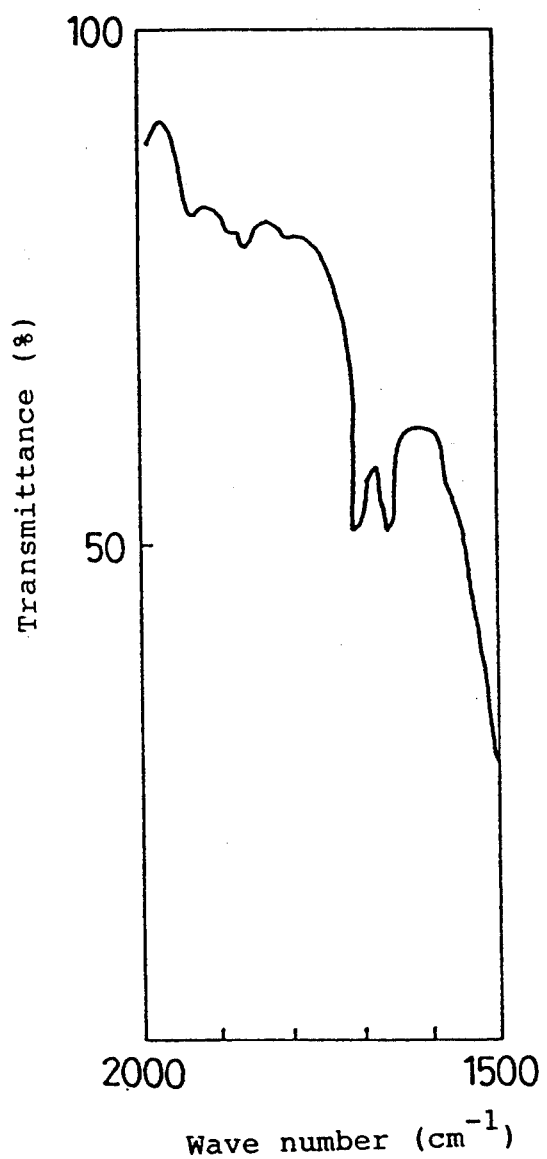
FIG. 1 is an infrared absorption spectrum of a 0.5-mm-thick copolymer sheet obtained in Example 1.

In the present invention, a diene which constitutes the diene unit of a propylene copolymer having a substantially syndiotactic structure is a cyclic diolefin having 6 to 25 carbon atoms, preferably 7 to 20 carbon atoms or an alkadiene having 6 to 25 carbon atoms, preferably 6 to 20 carbon atoms and having at least one terminal double bond.

The cyclic diolefin has at least one cyclic structure and two double bonds, and examples of the cyclic diolefin include norbornadiene, 5-methylene-2-norbornene, 4-vinyl-1-cyclohexene, 5-ethylidene-2-norbornene, 5-vinyl-2-norbornene, dicyclopentadiene, methylcyclopentadiene dimer and 1,5-cyclooctadiene.

Examples of the alkadiene having at least one terminal double bond include alkadienes each having one terminal double bond such as 1,4-hexadiene, 1,5-octadiene, 1,8-decadiene, 1,7-dodecadiene and 1,12-tetradecadiene, and alkadienes each having two terminal double bonds such as 1,5-hexadiene, 1,7-octadiene, 1,9- decadiene, 1,11-dodecadiene, 1,13-tetradecadiene and 1,17-octadecadiene.

The content of the repeating units of the diene is from 0.01 to 20 mol %, preferably 0.01 to 10 mol %. The content of the repeating units of the alkadiene each having two terminal double bonds is preferably from 0.01 to 5 mol %. When the content of the repeating units is less than 0.01 mol %, the objects of the present invention cannot be achieved, and when it is in excess of 5 mol %, a gel component having a highly branched structure is contained in the produced copolymer, so that the polymer is partially insoluble in a solvent and it is not partially melted, even when heated.

Of the above-mentioned dienes, the cyclic diolefin also has an effect of controlling the molecular weight of the syndiotactic polypropylene. Even when hydrogen is used with the intention of adjusting the molecular weight in manufacturing the syndiotactic polypropylene, the control of the molecular weight is not accomplished sufficiently, but the employment of the cyclic diolefin permits controlling the molecular weight so as to obtain a desired value.

Furthermore, a copolymer in which the repeating units of the alkadiene having the two terminal double bonds are contained has a small melt index (a high melt viscosity), a large die swell, a high melt strength, a large slip rate dependence of the melt viscosity and a large elastic modulus in the state of a melt, as compared with a syndiotactic polypropylene homopolymer.

Moreover, in case that such an alkadiene is copolymerized with propylene, one of the terminal double bonds is copolymerized with propylene to obtain a copolymer having a branched structure, and if reaction conditions are adjusted, the other terminal double bond is also copolymerized with propylene, so that a copolymer having a long-chain branched structure can be obtained.

The copolymer of the present invention can contain repeating units of an α-olefin having 2 to 20 carbon atoms other than propylene, particularly ethylene, so long as the copolymer has a substantially syndiotactic structure, i.e., so long as in a $^{13}$C-NMR spectrum measured in a 1,2,4-trichlorobenzene solution, a peak intensity attributed to a propylene chain having the syndiotactic structure and observed at about 20.2 ppm is 0.5 or more of the total peak intensity attributed to methyl groups of propylene. The content of the ethylene units is preferably from 0 to 60% by weight or less, more preferably from 0 to 50% by weight, and particularly preferably from 0 to 40% by weight.

The presence of ethylene improves copolymerizability of diene to propylene. Furthermore, a copolymer containing the propylene units, diene units and ethylene units can be vulcanized as in the case of EP rubbers, and therefore this kind of copolymer can also be used as a rubber.

The copolymer of the present invention has the feature that in a $^{13}$C-NMR spectrum measured in a 1,2,4-trichlorobenzene solution, a peak intensity (which is attributed to a methyl group in a propylene chain having the syndiotactic pentad chain) observed at about 20.2 ppm as the reference of tetramethylsilane is 0.5 or more of the total peak intensity. Moreover, the intrinsic viscosity of this copolymer measured in a tetralin solution at 135° C. is from 0.1 to 10 dl/g. When the intrinsic viscosity of the copolymer is in excess of 10, the melt viscosity is too high and molding is difficult. Conversely, when it is less than 0.1, the copolymer is soft and waxy, and it is difficult to singly mold the copolymer.

The copolymer of the present invention can be obtained by copolymerizing propylene, the above-mentioned diene and, if desired, an α-olefin such as ethylene in the presence of a catalyst. As the catalyst, there is used the catalyst which can provide a polypropylene having a syndiotactic pentad fraction of 0.7 or more when propylene alone is polymerized. The preferably usable catalyst is a combination of a transition metal compound represented by the formula

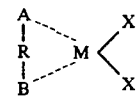

(wherein A and B are mutually different cyclic unsaturated hydrocarbon residues, R is a hydrocarbon residue having 1 to 20 carbon atoms or a group containing silicon or germanium which connects A with B, X is a halogen atom or a hydrocarbon residue having 1 to 20 carbon atoms, and M is a metal atom selected from titanium, zirconium or hafnium) and a co-catalyst.

Typical examples of the above-mentioned transition metal compound include isopropylidene(cyclopentadienylfluorenyl)zirconium dichloride and isopropylidene(cyclopentadienylfluorenyl)hafnium dichloride mentioned in the above J. A. Ewen et al. literature, and methylphenylmethylene(cyclopentadienylfluorenyl)zirconium dichloride, methylphenylmethylene(cyclopentadienylfluorenyl)hafnium dichloride, diphenylmethylene(cyclopentadienylfluorenyl)zirconium dichloride and diphenylmethylene(cyclopentadienylfluorenyl)hafnium dichloride mentioned in Japanese Patent Laid-open Nos. 2-274703 and 2-274704.

As the co-catalyst, an aluminoxane is preferably used, and ionic compounds mentioned in Japanese Patent Laid-open Nos. 2-501950 and 2-502036 may also be used.

Preferable examples of the aluminoxane include compounds represented by the formula

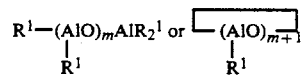

(wherein $R^1$ is a hydrocarbon residue having 1 to 3 carbon atoms, and m is an integer of from 1 to 50). In particular, what is suitably used is the aluminoxane in which $R^1$ is a methyl group and m is an integer of 5 or more.

For example, in case that the aluminoxane is used as the co-catalyst, the amount of the aluminoxane is from 10 to 100000 mol times, usually from 50 to 10000 mol times as much as that of the transition metal compound, and in case that the ionic compound is used as the co-catalyst, the amount of the ionic compound is from 0.1 to 100000 mol times, usually from 0.5 to 5000 mol times as much as that of the transition metal compound.

No particular restriction is put on polymerization process and polymerization conditions, and a known technique for the polymerization of an α-olefin is utilizable such as solvent polymerization using an inert hydrocarbon medium, bulk polymerization in which there is substantially no inert hydrocarbon medium, or gas phase polymerization. Usually, the polymerization temperature is from −100° to 200° C. and the polymerization pressure is from atmospheric pressure to 100 kg/cm². Preferably the temperature is from −50° to 100° C. and the pressure is from atmospheric pressure to 50 kg/cm².

Examples of the hydrocarbon medium used in the polymerization include saturated hydrocarbons such as butane, pentane, hexane, heptane, octane, nonane, decane, cyclopentane and cyclohexane as well as aromatic hydrocarbons such as benzene, toluene and xylene.

In order to further heighten the syndiotacticity of the copolymer obtained by the above-mentioned copolymerization process, it is effective to use a catalyst containing a transition metal compound which has been purified to the level of a high purity (90% or more) and to carry out the polymerization at a low temperature of 100° C. or less, and it is also effective to wash the copolymer with a hydrocarbon solvent.

The hydrocarbon solvent is a compound having 3 to 20 carbon atoms, and its examples include propylene, saturated hydrocarbons such as propane, butane, pentane, hexane, heptane, octane and nonane, aromatic hydrocarbon compounds such as benzene, toluene, xylene and ethyl benzene, and similar compounds in which a part or all of hydrogen atoms thereof are substituted by fluorine, chlorine, bromine or iodine. Examples of the other usable solvents include alcohols having 1 to 20 carbon atoms and ethers and esters having 2 to 20 carbon atoms which can dissolve or disperse a low-molecular atactic component therein. No particular restriction is put on a washing manner, but the washing is usually carried out at a temperature of from 0° C. to −100° C.

Of the copolymers of the present invention, the copolymer having the cyclic diolefin units or the alkadiene units having one terminal double bond as the diene units is reactive with various compounds, since it has the double bonds. Therefore, this kind of copolymer can be modified, for example, by a known process which is utilized in the field of isotactic polypropylene, whereby a useful resin can be obtained [S. Kitagawa et al., Polymer Bulletin, 10, 196-200 (1983), Japanese Patent Laid-open Nos. 61-85404 and 61-85405].

The present invention will be described in detail in reference to examples and comparative examples. However, these examples intend to merely describe the present invention, and they should not be understood to limit the present invention.

EXAMPLE 1

Preparation of Catalyst Solution 10 mg of isopropylidene(cyclopentadienylfluorenyl)-zirconium dichloride which was synthesized in accordance with the above-mentioned J. A. Ewen et al. literature was dissolved in 20 ml of toluene, and 2.6 g of methyl aluminoxane (polymerization degree 17.7) made by Toso Akzo Co., Ltd. was added to the resultant solution to prepare a violet catalyst solution.

Polymerization Process

After the atmosphere in a 2-liter autoclave was replaced with nitrogen, 1 liter of pentane and 3.0 g of 5-methylene-2-norbornene were placed therein. The atmosphere in the autoclave was replaced with propylene, and afterward, the above-mentioned solvent solution was added thereto in an amount of $9.2 \times 10^{-3}$ millimols in terms of zirconium atoms. Furthermore, propylene was added, and polymerization was then carried out at 40° C. for 1 hour, while the pressure in the autoclave was maintained at 9 kg/cm² (gauge pressure). After the completion of the polymerization, the resultant slurry was taken out from the autoclave, and 1 liter of heptane was added to wash the slurry, followed by filtration and drying, thereby obtaining 29.4 g of a copolymer powder.

In addition, the filtrate was distilled off under reduced pressure to remove the solvent therefrom, so that 5.2 g of a component which was soluble in the solvent were obtained.

Figure 2:
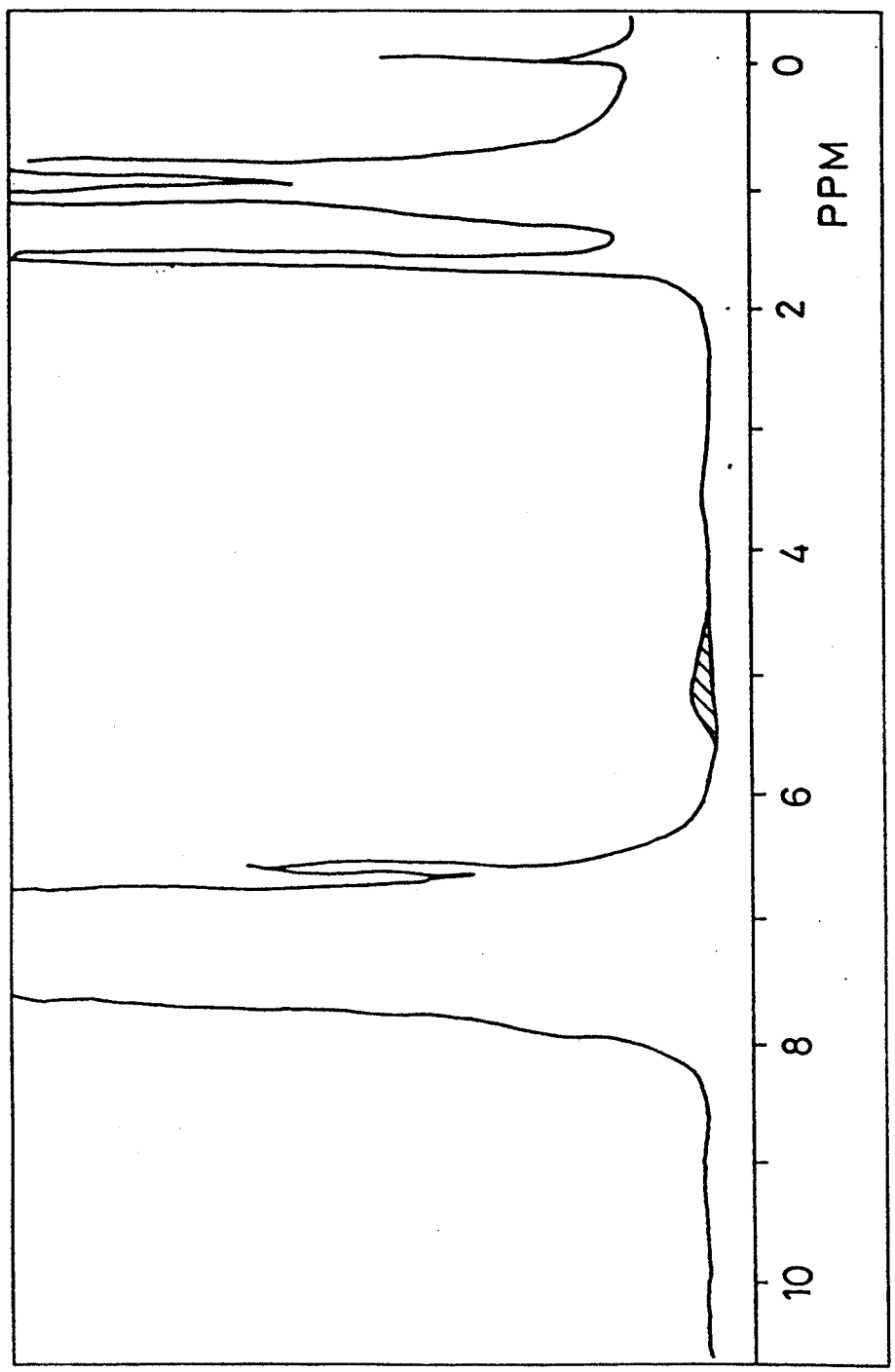
FIG. 2 is a $^1$H-NMR spectrum, which was measured in a benzene-$d_6$ solution, of a copolymer obtained in Example 1.

According to measurement in a tetralin solution at 135° C., the intrinsic viscosity (hereinafter referred to simply as "[$\eta$]") of the powder was 0.62 (dl/g), and according to measurement by the use of $^{13}$C-NMR, the syndiotactic pentad fraction of the powder calculated from a peak intensity at about 20.2 ppm was 0.82. Moreover, in the $^1$H-NMR spectrum (FIG. 2) of the resultant copolymer measured in a benzene-$d_6$ solution, a peak attributed to protons of the adjacent methylene groups of the double bond of 5-methylene-2-norbornene was observed.

According to a peak attributed to a double bond at about 1640 cm$^{-1}$ in the infrared absorption spectrum (FIG. 1) of a 0.5-mm-thick sheet prepared from the above-mentioned copolymer, the content of 5-methylene-2-norbornene was 2.3% by weight. Furthermore, according to measurement at a temperature rise rate of 10° C./minute by the differential scanning calorimetric analysis (DSC), the melting point of the copolymer was 143.4° C. According to measurement by a gel permeation chromatography (GPC), the molecular weight distribution (Mw/Mn) of the copolymer was 4.9.

EXAMPLE 2

Polymerization was carried out by the same procedure as in the previous section [Polymerization Process] of Example 1 except that 5-methylene-2-norbornene was replaced with 3.0 g of 5-ethylidene-2-norbornene. A copolymer powder was obtained in an amount of 32.7 g, and the amount of a heptane-soluble component was 4.8 g.

In the powder, [$\eta$] was 0.54, Mw/Mn was 3.6, and syndiotactic pentad fraction was 0.83.

Figure 3:
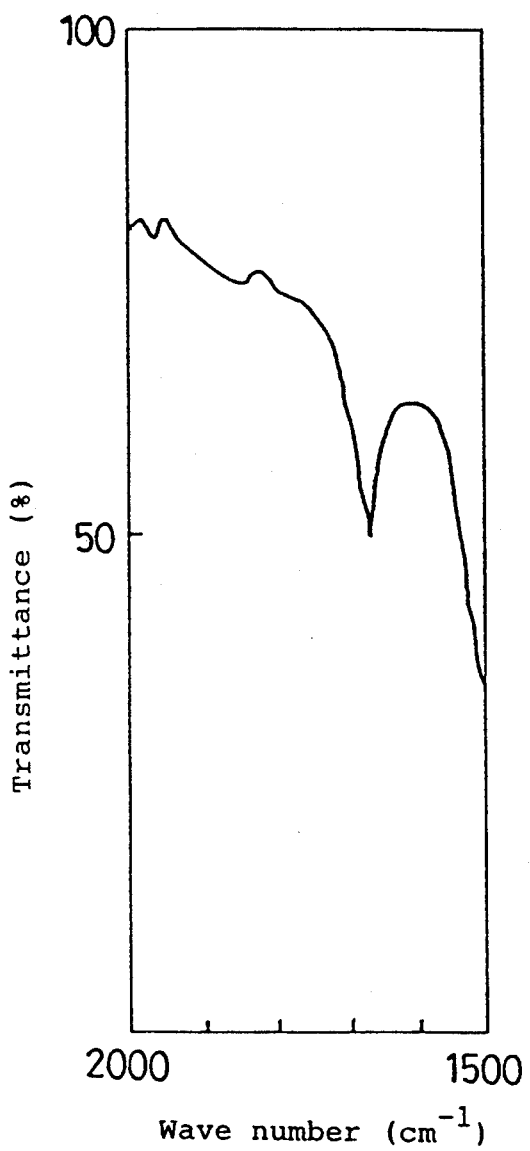
FIG. 3 is an infrared absorption spectrum of a 0.5-mm-thick copolymer sheet obtained in Example 2.
Figure 4:
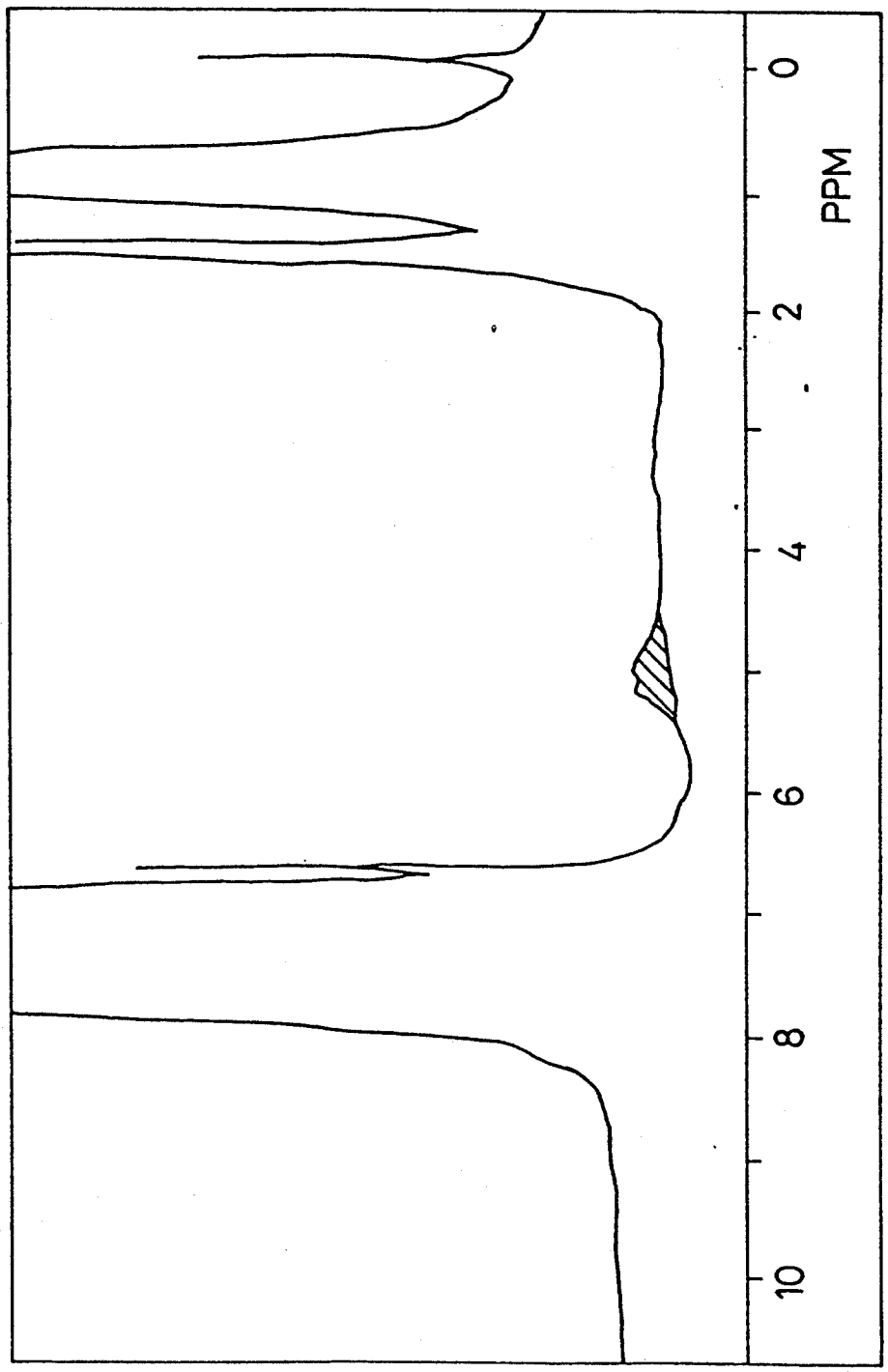
FIG. 4 is a $^1$H-NMR spectrum, which was measured in a benzene-$d_6$ solution, of a copolymer obtained in Example 2.

In the $^1$H-NMR spectrum (FIG. 4) of the resultant copolymer measured in a benzene-$d_6$ solution, a peak attributed to protons of the adjacent methylene groups of the double bond of 5-ethylidene-2-norbornene was observed. According to the infrared absorption spectrum (FIG. 3) of a 0.5-mm-thick sheet prepared from the above-mentioned copolymer, the content of 5-ethylidene-2-norbornene was 2.3% by weight, and according to measurement by the use of DSC, the melting point of the copolymer was 144.5° C.

EXAMPLE 3

Polymerization was carried out by the same procedure as in the previous section [Polymerization Process] of Example 1 except that 5-methylene-2-norbornene was replaced with 3.0 g of 1,7-octadiene. A copolymer powder was obtained in an amount of 127 g, and the amount of a heptane-soluble component was 0.2 g.

The [$\eta$] and the syndiotactic pentad fraction of the powder were 2.68 and 0.84, respectively.

Figure 5:
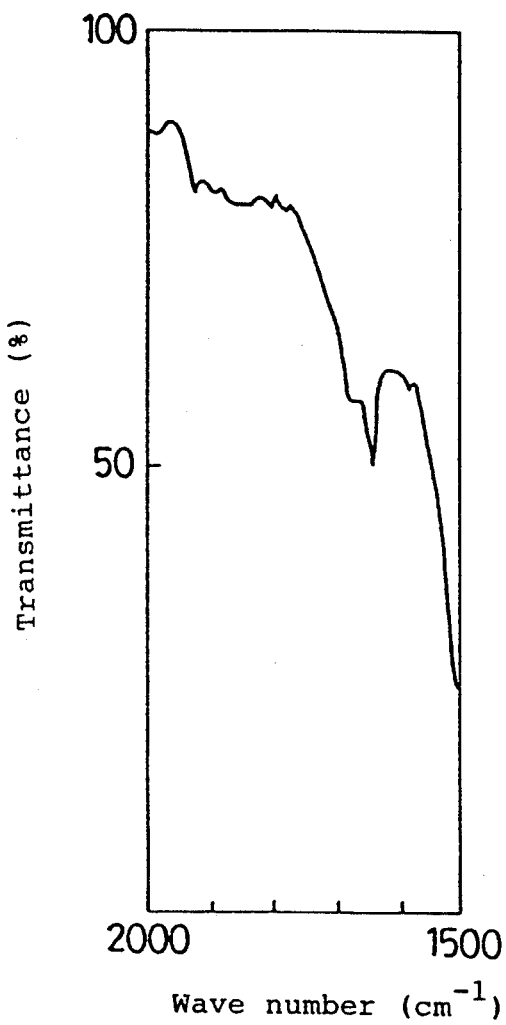
FIG. 5 is an infrared absorption spectrum of a 0.5-mm-thick copolymer sheet obtained in Example 3.
Figure 6:
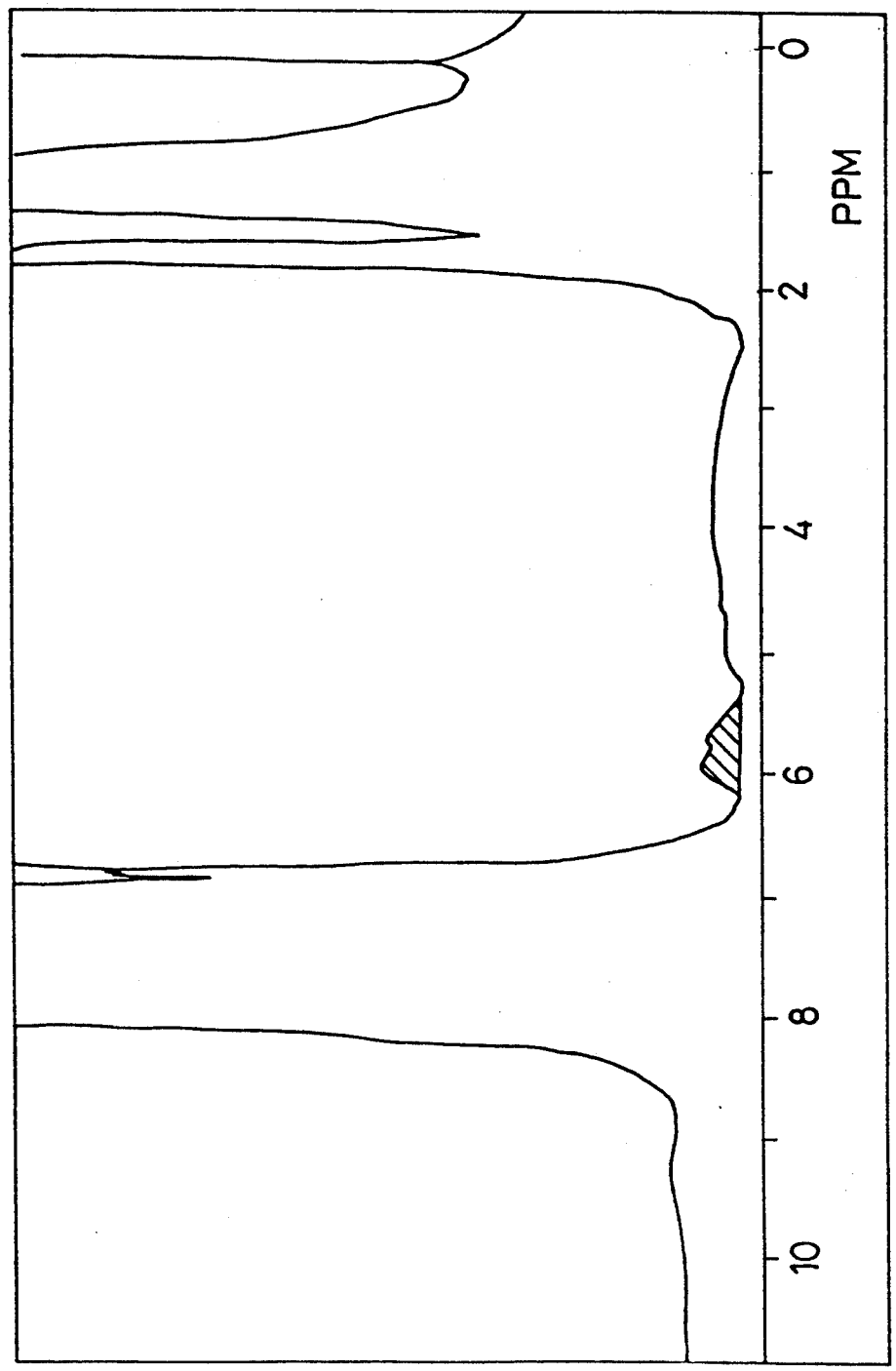
FIG. 6 is a $^1$H-NMR spectrum, which was measured in a benzene-$d_6$ solution, of the copolymer obtained in Example 3.

In the $^1$H-NMR spectrum (FIG. 6) of the resultant copolymer measured in a benzene-$d_6$ solution, a peak attributed to vinyl protons at about 6.0 ppm was observed, and according to calculation, its amount was 0.5 mol %. In the infrared absorption spectrum (FIG. 5) of a 0.5-mm-thick sheet prepared from the above-mentioned copolymer, the absorption of a vinyl group was observed at about 1640 cm$^{-1}$, and it was confirmed that 1,7-octadiene was copolymerized.

COMPARATIVE EXAMPLE 1

Polymerization was carried out by the same procedure as in the previous section [Polymerization Process] of Example 1 except that 5-methylene-2-norbornene was not used. A copolymer powder was obtained in an amount of 140 g, and the amount of a heptane-soluble component was 0.1 g.

Figure 7:
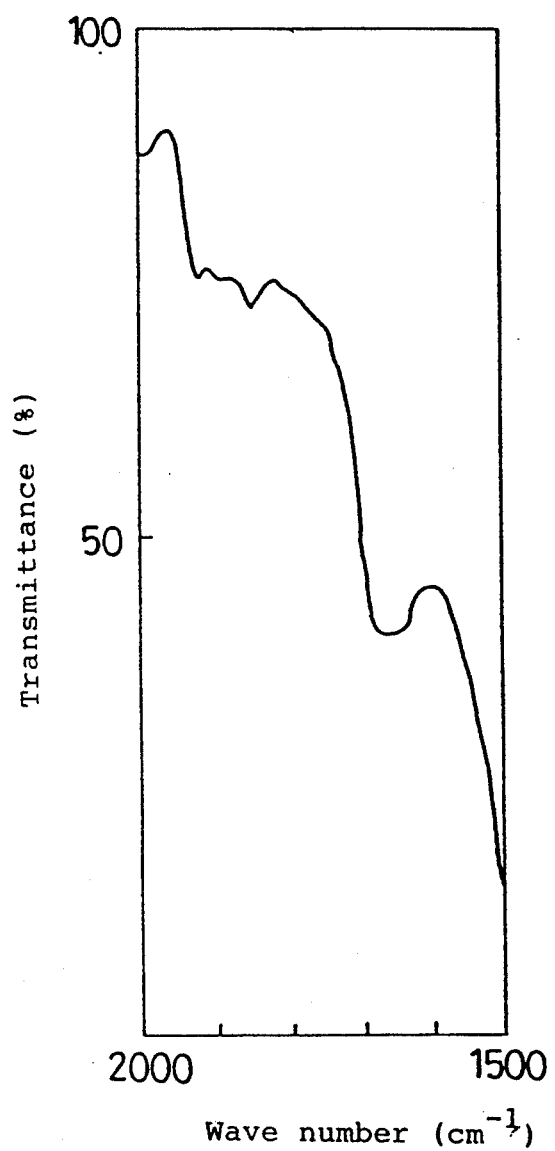
FIG. 7 is an infrared absorption spectrum of a 0.5-mm-thick polymer sheet obtained in Comparative Example 1.

The [$\eta$] and the syndiotactic pentad fraction of the powder were 1.40 and 0.86, respectively. The infrared absorption spectrum of a 0.5-mm-thick sheet prepared from the above-mentioned copolymer is shown in FIG. 7.

EXAMPLE 4

10 mg of the same transition metal compound and 1.36 g of the same aluminoxane as used in Example 1 were placed in a 5-liter autoclave, and 1.5 kg of propylene and 6 g of 5-ethylidene-2-norbornene and ethylene were placed therein so that the partial pressure of ethylene might be 10 kg/cm$^2$ (gauge pressure). Afterward, polymerization was carried out at 50° C. for 1 hour to obtain 116.7 g of a polymer. The ethylene content and 5-ethylidene-2-norbornene content of this polymer were 29% by weight and 1% by weight, respectively, and the [$\eta$] of the polymer was 0.38. According to $^{13}$C-NMR, the ratio of a peak intensity observed at about 20.2 ppm to the total peak intensity attributed to methyl groups of propylene was 0.72.

EXAMPLE 5

Preparation of Catalyst Solution

In 35 ml of toluene were dissolved 20 mg of isopropyl(cyclopentadienylfluorenyl)zirconium dichloride and 14.4 ml of a 20% toluene solution of methyl aluminoxane (made by Toso Akzo Co., Ltd.), thereby preparing a catalyst solution.

Polymerization Process

After the atmosphere in a 3-liter autoclave was replaced with nitrogen, 1 liter of pentane and 0.60 g of 7-octadiene were placed therein. The atmosphere in the system was replaced with propylene.

The above-mentioned solvent solution was added in an amount of 9.2×10$^{-3}$ millimols in terms of zirconium atoms, and propylene was then added to the system. Copolymerization was then carried out at 40° C. for 1 hour, while the pressure in the autoclave was maintained at 9 kg/cm$^2$ (gauge pressure), and afterward, 15 ml of isopropanol was added thereto to bring the reaction to an end. After cooling, the resultant slurry was taken out from the autoclave, and 1 liter of heptane was added thereto, followed by filtration. The resultant filter cake was washed with 1 liter of heptane and then dried to obtain 149 g of a polymer powder. Separately, the wash solvents were joined and then evaporated to dryness in vacuo to obtain 12.02 g of a heptane-soluble component.

The thus obtained polymer was completely dissolved in hot tetralin, and with regard to the polymer, [$\eta$] was 1.48, syndiotactic pentad fraction was 0.87, melt index was 1.6 (g/10 minutes), die swell was 1.60 (−), and melt strength measured at 220° C. was 2.2 (g) (take-off speed 150 m/minute).

Furthermore, methods for measuring the respective physical properties are as follows:

The melt index was measured at 230° C. under a load of 2.16 kg by the use of a nozzle having a diameter of 2.19 mm and a length of 8 mm in accordance with ASTM D-1238 (JIS K7210).

The die swell was determined as the ratio of the diameter of a resin extruded at the time of the above-mentioned melt index measurement to the diameter of the nozzle.

The melt strength was measured by the use of a melt index measuring device in which a resin winding machine and a load cell for measuring tension were provided.

The syndiotactic pentad fraction was measured in accordance with the procedure described in Japanese Patent Laid-open No. 2-41303.

$^1$H-NMR was measured in benzene-d$_6$ as a solvent by the use of a spectroscope of 270 MHz.

EXAMPLE 6

The same procedure as in Example 5 was effected except that the amount of 1,7-octadiene was changed to 0.40 g, thereby obtaining 152 g of a polymer powder.

With regard to the thus obtained powder, [$\eta$] was 1.40, syndiotactic pentad fraction was 0.28, melt index was 3.0, die swell was 1.43, and melt strength measured at 220° C. was 1.8.

COMPARATIVE EXAMPLE 2

The same procedure as in Example 5 was effected except that 1,7-octadiene was not used, thereby obtaining 140 g of a polymer powder and 0.1 g of a solvent-soluble component. With regard to this powder, [$\eta$] was 1.40, syndiotactic pentad fraction was 0.86, melt index was 3.6, die swell was 1.09, and melt strength measured at 220° C. was 1.78.

EXAMPLE 7

The same procedure as in Example 5 was effected except that 3.0 g of 1,7-octadiene was used, thereby obtaining 127 g of a polymer powder and 0.2 g of a solvent-soluble component.

The thus obtained powder was completely dissolved in tetralin at 135° C., and with regard to the polymer, [$\eta$] was 2.68, syndiotactic pentad fraction was 0.84, and melt index was 0.08 (dl/10 minutes).

The above-mentioned copolymer was blended with a stabilizing agent and then retained at 230° C. under 120 kg/cm$^2$ for 3 minutes to prepare a pressed sheet. This sheet was transparent, but the unevenness of transparency was slightly observed. Thus, it was judged that in the sheet obtained under the above-mentioned conditions, the formation of a gel began.

Figure 8:
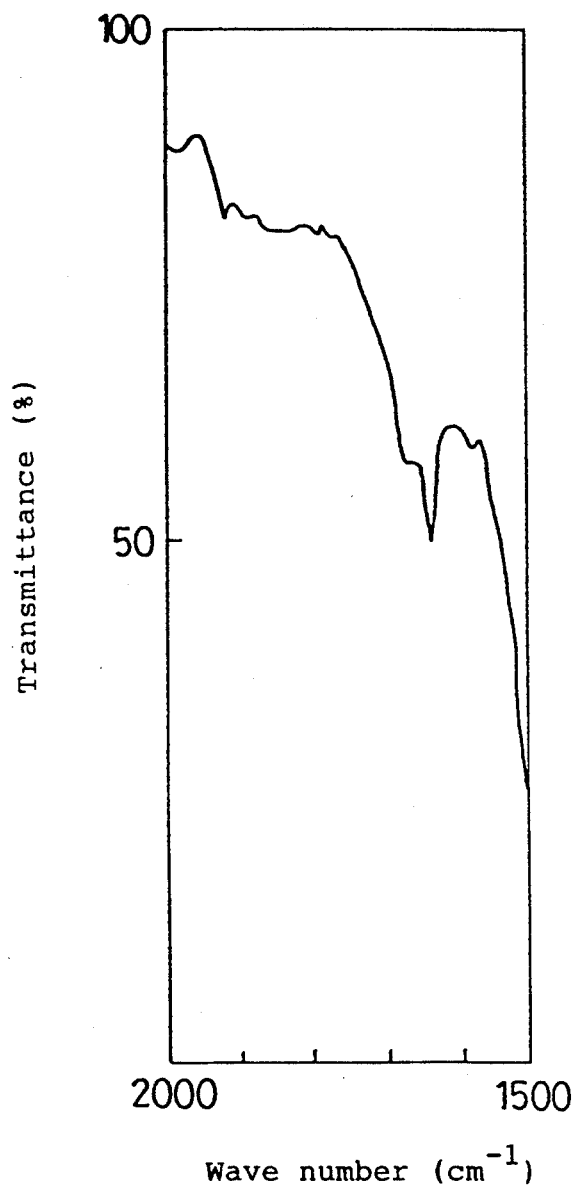
FIG. 8 is an infrared absorption spectrum of a 0.7-mm-thick copolymer sheet obtained in Example 7.
Figure 9:
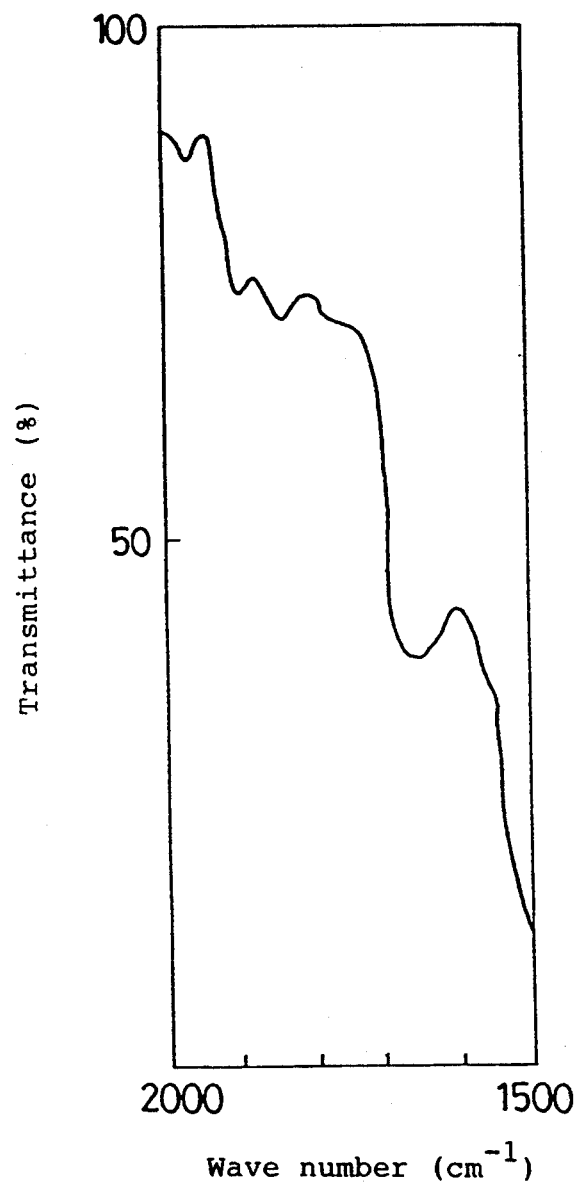
FIG. 9 is an infrared absorption spectrum of a 0.7-mm-thick polymer sheet obtained in Comparative Example 2.

FIG. 8 shows the infrared absorption spectrum of the above-mentioned pressed sheet having a thickness of 0.70 mm, and FIG. 9 is the infrared absorption spectrum of the similar sheet of the polymer obtained in Comparative Example 2.

With regard to the copolymer of Example 7, the absorption of a vinyl group was present at 1640 cm$^{-1}$, and it was apparently observed that 1,7-octadiene was copolymerized.

Figure 10:
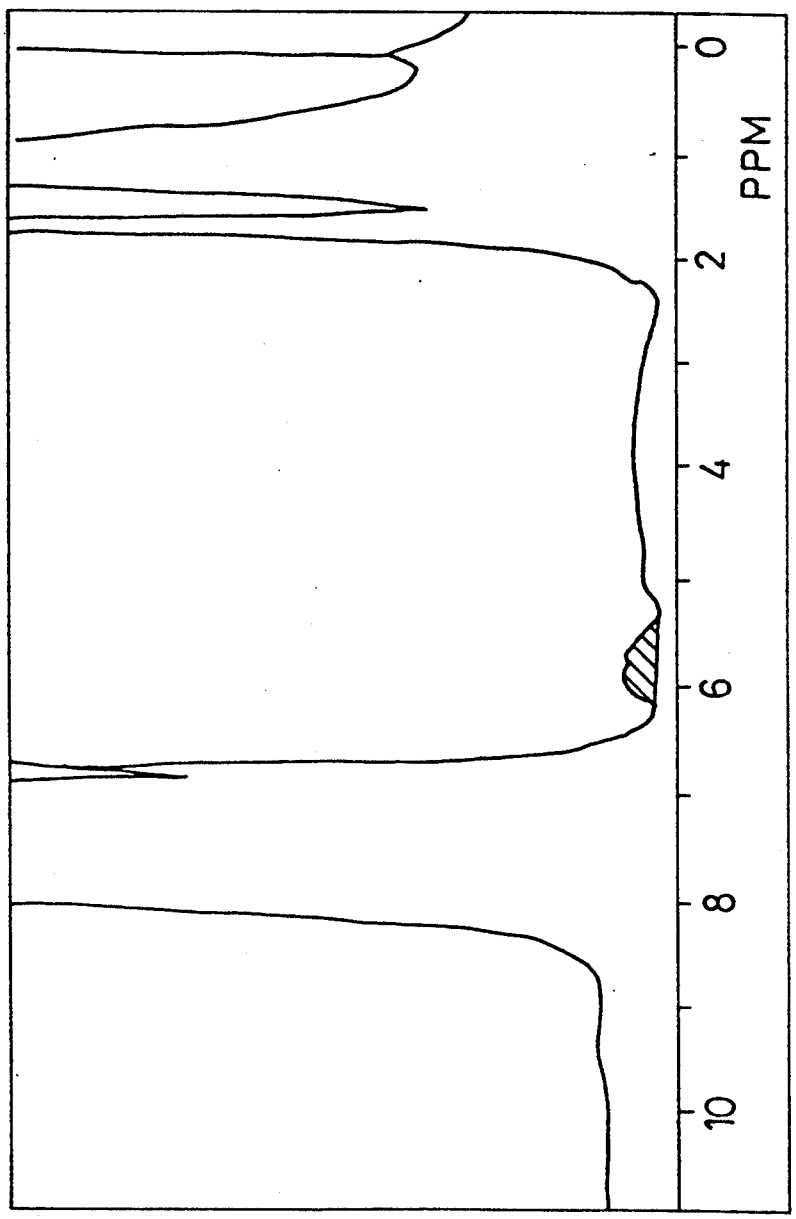
FIG. 10 is a $^1$H-NMR spectrum, which was measured in a benzene-$d_6$ solution, of a copolymer obtained in Example 7.

Next, the vinyl group was quantitatively analyzed by measuring a $^1$H-NMR spectrum. The measurement was carried out in benzene-d$_6$ as a solvent at 140° C. by the use of a spectroscope of 270 MHz. In the quantitative analysis of the diene incorporated in the polymer, the technique described in Japanese Patent Laid-open No. 2-64111 was utilized for reference. As shown in FIG. 10, absorption based on vinyl protons was observed at about 6.0 ppm, and according to calculation, its amount (a pendant vinyl group) was 0.5 mol %.

The theory regarding the gelation of a polymer indicates that the gelation occurs at the point when 50% or more of the pendant vinyl group is reacted, and thus the amount of the vinyl group at this point of time was also 0.5 mol %. After all, the 1,7-octadiene content in the propylene copolymer was estimated to be 1.0 mol %.

The reacting weight of 1,7-octadiene was substantially quantitative, judging from the fact that the feed of 1,7-octadiene was 3.0 g and the amount of the polymer was 127 g.

REFERENCE EXAMPLE

Figure 11:
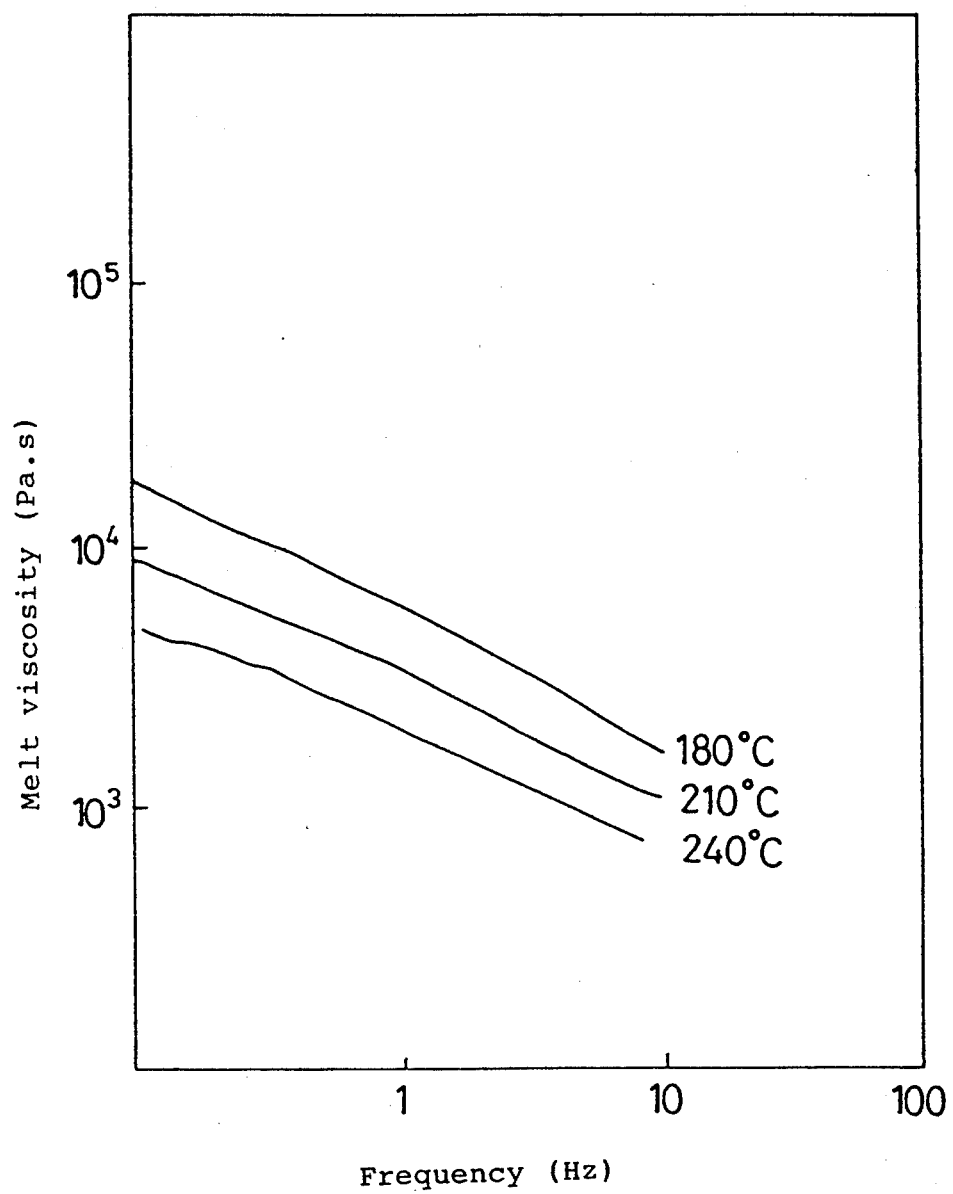
FIG. 11 is a graph in which melt viscosity of a copolymer in Example 5 is plotted to frequency by changing temperatures.
Figure 12:
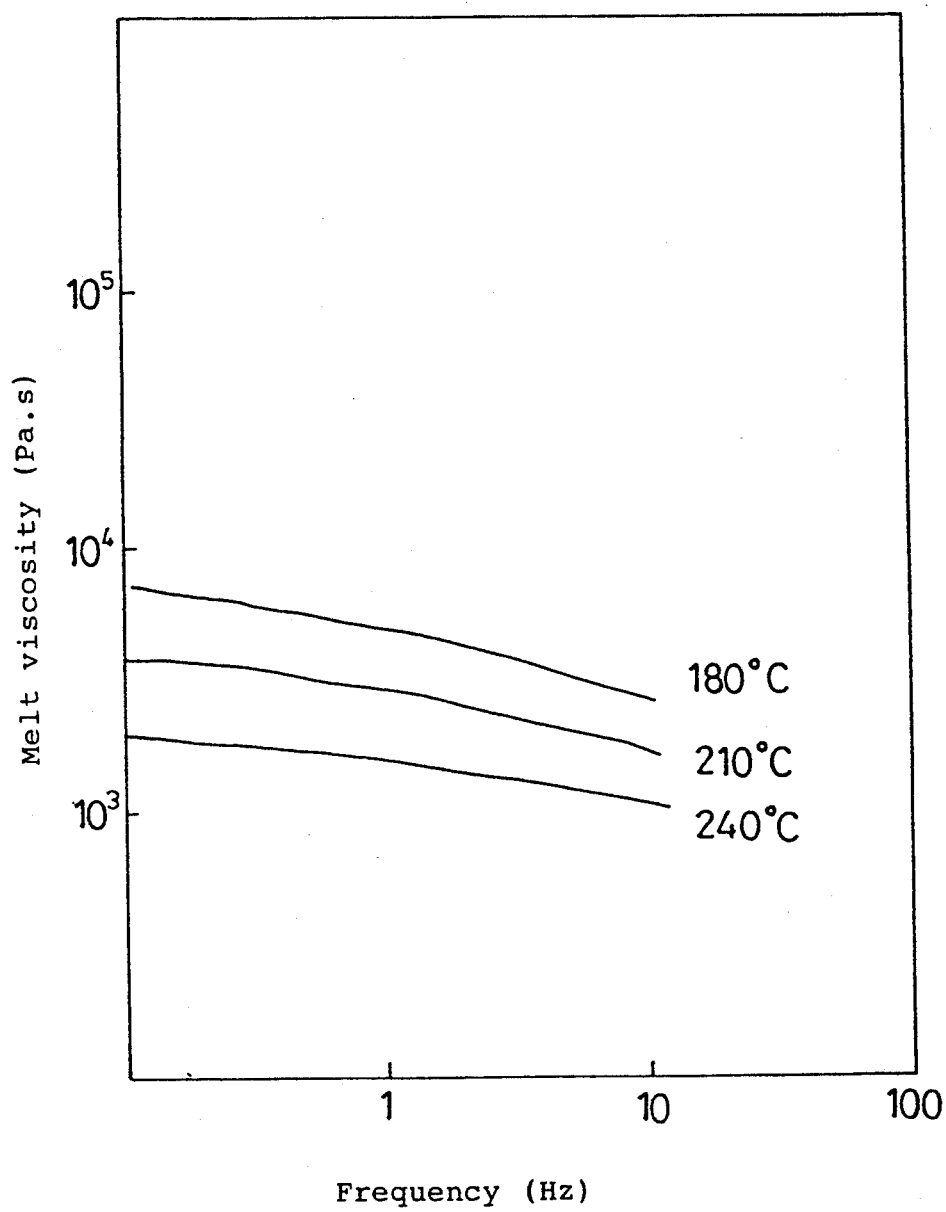
FIG. 12 is a graph in which melt viscosity of the polymer in Comparative Example 2 is plotted to frequency by changing temperatures.

FIGS. 11 and 12 show the frequency dependence of the melt viscosity of the copolymer in Example 4 and the syndiotactic polypropylene homopolymer in Comparative Example 2.

The viscosity of the homopolymer was scarcely affected by the frequency, and thus the homopolymer behaves like Newtonian viscosity. On the other hand, the frequency dependence of the viscosity of the copolymer in Example 4 was large, and in the copolymer, non-Newtonian viscosity was noticeable.

Figure 13:
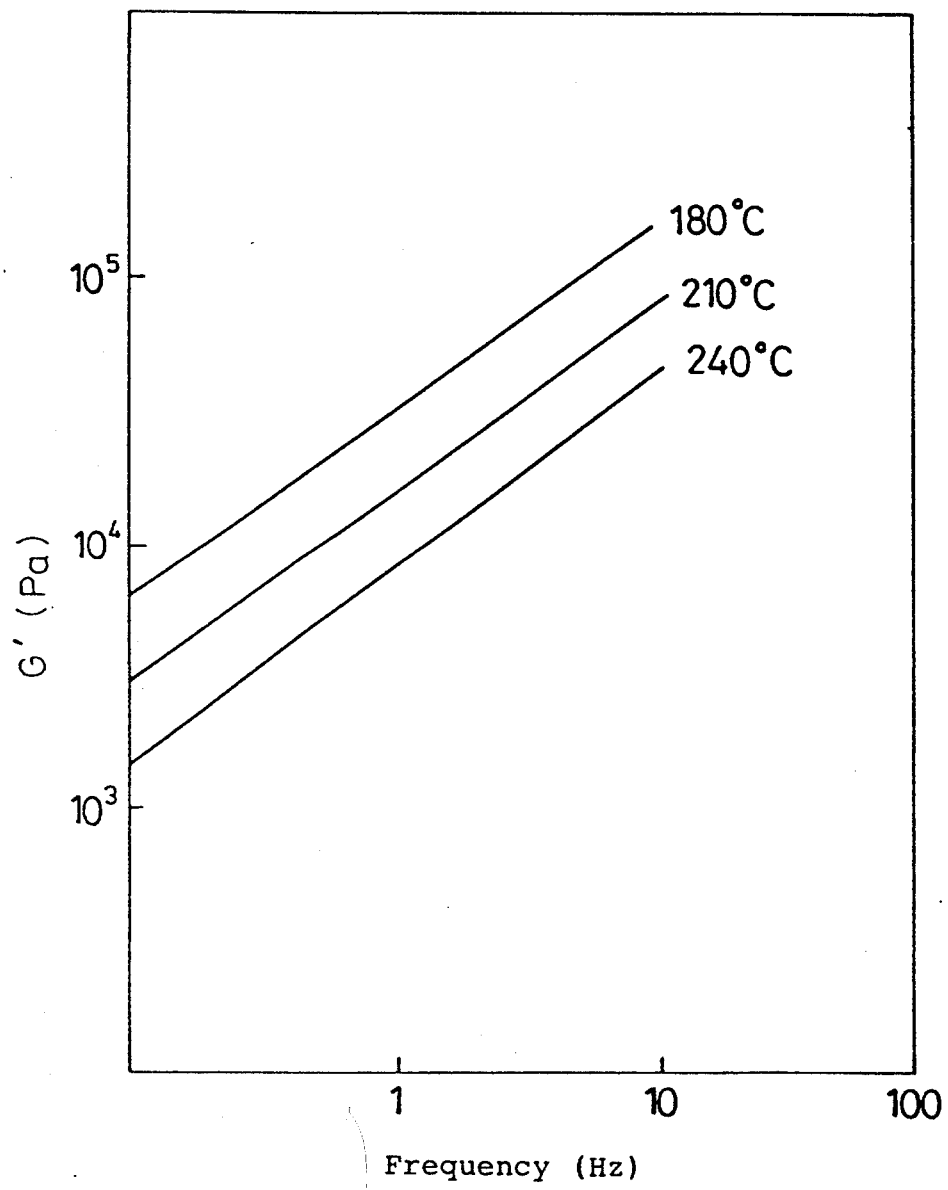
FIG. 13 is a graph in which storage elastic modulus of the copolymer in Example 5 is plotted to frequency by changing temperatures.
Figure 14:
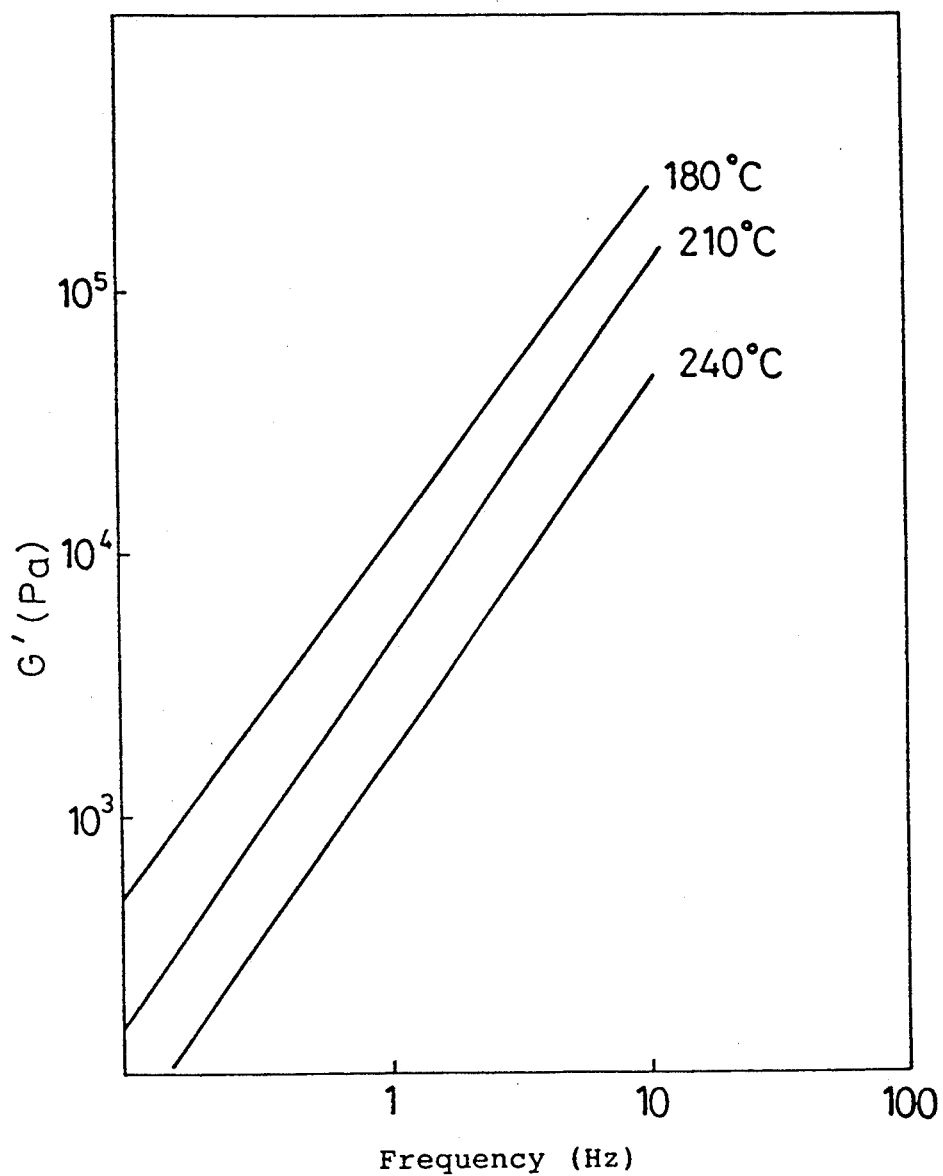
FIG. 14 is a graph in which storage elastic modulus of the polymer in Comparative Example 2 is plotted to frequency by changing temperatures.

In FIGS. 13 and 14, the storage elastic modulus (G') of the above-mentioned copolymer and homopolymer is plotted to frequency. As presumed from a polymer having a long-chain branched structure, the sample of Example 4 exhibited the large storage elastic modulus.

Of the copolymers of the present invention, the copolymer having double bonds in the polymer chain can be modified to form a polymer having improved characteristics.

Furthermore, in case that a cyclic diolefin is used as a comonomer, the molecular weight of the copolymer can be controlled to a desired value during copolymerization.

In addition, a multi-dimensional copolymer containing ethylene and the like and a copolymer containing an alkadiene having two terminal double bonds as the diene units have the above-mentioned characteristics.

As described above, the copolymer of the present invention is industrially very valuable.

We claim:

1. A propylene copolymer having a substantially syndiotactic structure which comprises the repeating units of propylene and the repeating units of at least one diene selected from the group consisting of cyclic diolefins having 6 to 25 carbon atoms and alkadienes having 6 to 25 carbon atoms and at least one terminal double bond; the content of the repeating units of said diene being from 0.01 to 20 mol %; in the $^{13}$C-NMR spectrum of said copolymer measured in a 1,2,4-trichlorobenzene solution, a peak intensity observed at about 20.2 ppm as the reference of tetramethylsilane being 0.5 or more of the total peak intensity attributed to methyl groups of propylene; the intrinsic viscosity of said copolymer measured in a tetralin solution at 135° C. being from 0.1 to 10 dl/g.

2. The copolymer according to claim 1 wherein the amount of said repeating units of said diene is in the range of from 0.01 to 10 mol %.

3. The copolymer according to claim 1 wherein said cyclic diolefin has at least one cyclic structure, two double bonds and 7 to 20 carbon atoms.

4. The copolymer according to claim 3 wherein said cyclic diolefin is norbornadiene, 5-methylene-2-norbornene, 4-vinyl-1-cyclohexene, 5-ethylidene-2-norbornene, 5-vinyl-2-norbornene, dicyclopentadiene, methylcyclopentadiene dimer or 1,5-cyclooctadiene.

5. The copolymer according to claim 1 wherein said alkadiene has one terminal double bond and 6 to 20 carbon atoms.

6. The copolymer according to claim 5 wherein said alkadiene is 1,4-hexadiene, 1,5-octadiene, 1,8-decadiene, 1,7-dodecadiene or 1,12-tetradecadiene.

7. The copolymer according to claim 1 wherein said alkadiene has two terminal double bonds and 6 to 20 carbon atoms.

8. The copolymer according to claim 7 wherein said alkadiene is 1,5-hexadiene, 1,7-octadiene, 1,9-decadiene, 1,11-dodecadiene, 1,13-tetradecadiene or 1,17-octadecadiene.

9. The copolymer according to claim 1 further containing the repeating units of an α-olefin having 2 to 20 carbon atoms other than propylene.

10. The copolymer according to claim 1 wherein said repeating units of ethylene are contained in an amount of 40% by weight or less.

* * * * *